(12) United States Patent
Zami et al.

(10) Patent No.: US 8,774,633 B2
(45) Date of Patent: Jul. 8, 2014

(54) ELEMENT OF A WAVELENGTH DIVISION MULTIPLEXING OPTICAL NETWORK

(75) Inventors: Thierry Zami, Nozay (FR); Jean-Marc Rainsant, Nozay (FR); Nicolas Lemonnier, Massy (FR)

(73) Assignee: Alcatel Lucent, Paris (FR)

( * ) Notice: Subject to any disclaimer, the term of this patent is extended or adjusted under 35 U.S.C. 154(b) by 129 days.

(21) Appl. No.: 13/579,866

(22) PCT Filed: Feb. 11, 2011

(86) PCT No.: PCT/EP2011/052079
§ 371 (c)(1),
(2), (4) Date: Sep. 20, 2012

(87) PCT Pub. No.: WO2011/107338
PCT Pub. Date: Sep. 9, 2011

(65) Prior Publication Data
US 2013/0108265 A1    May 2, 2013

(30) Foreign Application Priority Data

Mar. 1, 2010 (FR) ..................................... 10 51452

(51) Int. Cl.
*H04J 14/02* (2006.01)
(52) U.S. Cl.
USPC ......................................................... 398/83

(58) Field of Classification Search
CPC .............. H04J 14/0202; H04J 14/0204; H04J 14/0205; H04J 14/021; H04J 14/0212; H04J 14/0213
USPC ........................................................ 398/83–85
See application file for complete search history.

(56) References Cited

U.S. PATENT DOCUMENTS

| 2007/0286605 | A1 | 12/2007 | Feuer et al. | |
| 2008/0056715 | A1 | 3/2008 | Akiyama et al. | |
| 2011/0262143 | A1* | 10/2011 | Ji et al. | ............................. 398/83 |

* cited by examiner

*Primary Examiner* — Leslie Pascal
(74) *Attorney, Agent, or Firm* — Carmen Patti Law Group, LLC

(57) ABSTRACT

A network element (10) comprises:
a first optical input section (1), a first optical output section (2), a second optical input section (3) and a second optical output section (4)
a first and second insertion and extraction modules (30, 40), each of said insertion and extraction modules comprising a wavelength selection switch (31, 41),
a first optical coupler (8) comprising two bidirectional branches (21, 22) respectively connected to the first selectable port of the first and second insertion and extraction modules, and
a second optical coupler (11) comprising two bidirectional branches (23, 24) respectively connected to the second selectable port of the first and second insertion and extraction modules.

10 Claims, 1 Drawing Sheet

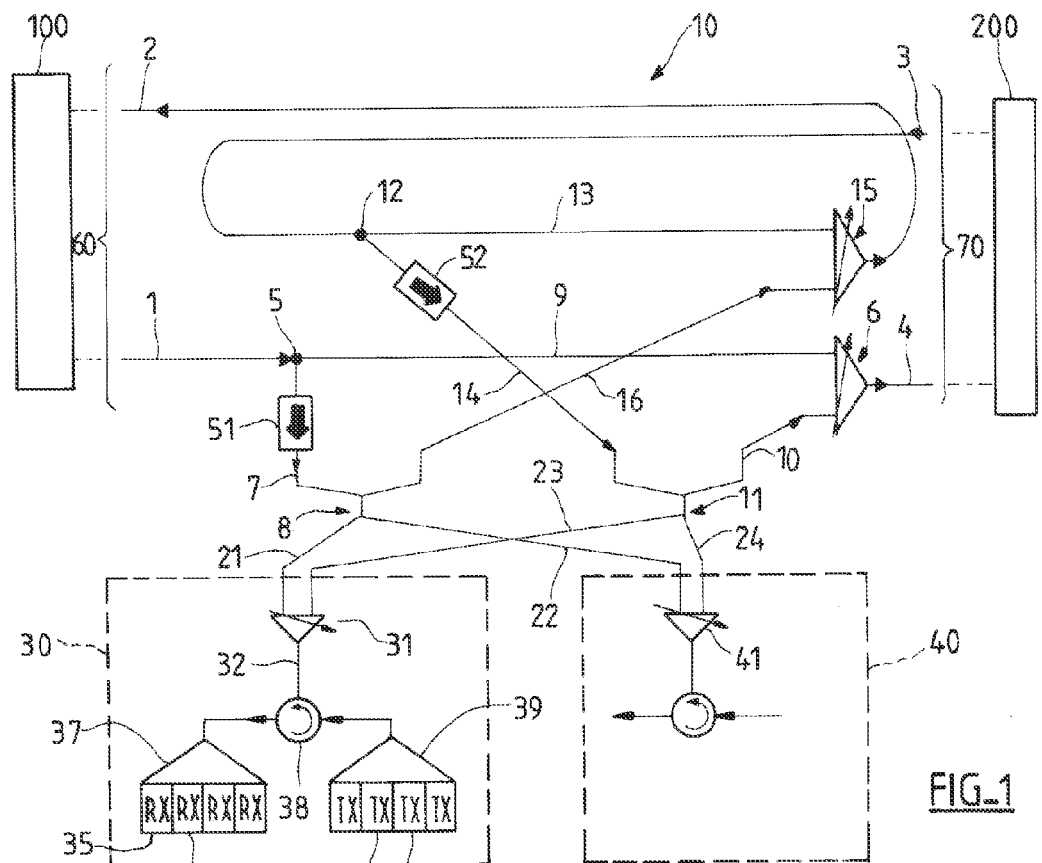
FIG_1
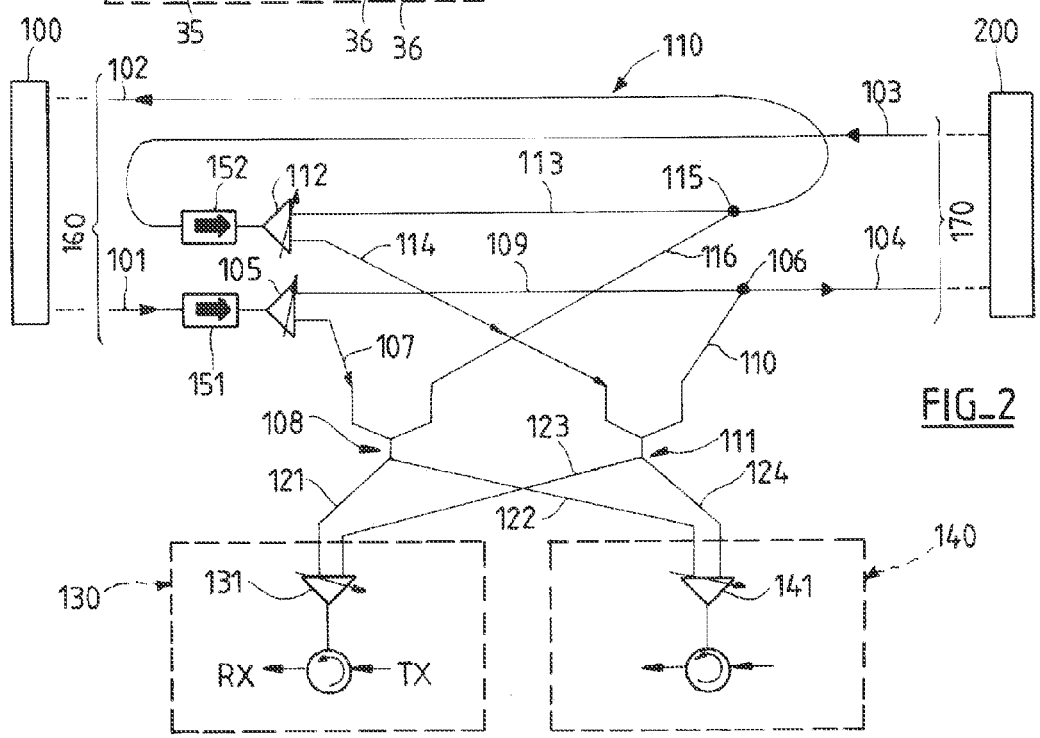
FIG_2

ELEMENT OF A WAVELENGTH DIVISION MULTIPLEXING OPTICAL NETWORK

TECHNICAL FIELD

The invention pertains to the field of network elements for wavelength division multiplexing, or WDM, optical networks, and more particularly to transparent switching nodes for such networks.

BACKGROUND

The term "transparent" is applied to a transmission system in which the signal remains optical without being converted into an electronic signal. Transparency in optical communication networks is a characteristic that makes it possible to reduce the cost of network equipment by eliminating optical-electrical-optical conversions, and therefore the corresponding transducers. Subsystems used in transparent WDM networks particularly include reconfigurable optical add-drop multiplexers, or ROADMs, and optical crossconnects, or OXCs. In order to construct such subsystems, equipment known as wavelength selective switches, or WSSs, are particularly attractive. This is because this equipment makes it possible to create switching nodes with any degree whatsoever having a very flexible configuration with a much simpler structure than when using discrete components, as well as a reduced size and high reliability. However, they do exhibit a relatively high cost.

US-A-2008056715 describes transparent WDM switching node architectures in which WSSs are used bidirectionally to carry out functions such as inserting optical signals, extracting optical signals, and transparently transmitting optical signals between multiple directions. Due to the bidirectional use of the WSSs, a wavelength attenuation adjustment assigns the signals to that wavelength in both directions of travel.

SUMMARY

In one embodiment, the invention provides a network element for a wavelength division multiplexing optical network, said network element comprising,
a first optical input section intended to be connected to a first neighboring network element to receive a first incoming traffic from the first neighboring network element,
a first optical output section intended to be connected to said first neighboring network element to transmit a first outgoing traffic to the first neighboring network element,
a second optical input section intended to be connected to a second neighboring network element to receive a second incoming traffic from the second neighboring network element,
a second optical output section intended to be connected to said second neighboring network element to transmit a second outgoing traffic to the second neighboring network element,
first and second insertion and extraction modules, each of said insertion and extraction modules comprising:
a wavelength selective switch comprising a shared port and a plurality of selectable ports, said switch being configured to selectively allow through a first subset of wavelengths of the optical network between said shared port and a first of said selectable ports, said switch being configured to selectively allow through a second subset of wavelengths of the optical network between said shared port and a second of said selectable ports,
a plurality of optical receivers connected to the shared port for receiving through the first selectable port, optical signals whose wavelengths belong to the first subset, and through the second selectable port, optical signals whose wavelengths belong to the second subset, and
a plurality of optical transmitters connected to the shared port for sending through the first selectable port, optical signals whose wavelengths belong to the first subset, and through the second selectable port, optical signals whose wavelengths belong to the second subset, and
said network element further comprising:
a first optical coupler comprising two bidirectional branches respectively connected to the first selectable port of the first and second insertion and extraction modules, an input branch connected to the first input section to allow optical signals to be extracted through to said two bidirectional branches, and an output branch connected to the first output section to allow optical signals to be inserted through to said two bidirectional branches, and
a second optical coupler comprising two bidirectional branches respectively connected to the first selectable port of the first and second insertion and extraction modules, an input branch connected to the second input section to allow optical signals to be extracted through to said two bidirectional branches, and an output branch connected to the second output section to allow optical signals to be inserted through to said two bidirectional branches.

In other advantageous embodiments, the network element may exhibit one or more of the following characteristics:
- it comprises a first optical transit section for allowing a first transit traffic to pass between the first input section and the second output section, and a second optical transit section for allowing a second transit traffic to pass between the second input section and the first output section.
- each of the first and second transit sections comprises a wavelength selection module for selecting the first, and respectively second, transit traffic through wavelength filtering applied to the first, and respectively second, incoming traffic.
- the wavelength selection module comprises a wavelength blocker and/or a wavelength selective switch.
- the wavelength selection module comprises a wavelength selective switch exhibiting a shared port connected to the first, and respectively second, input section, a first selectable port connected to the second, and respectively first, output section, and a second selectable port connected to the input branch of the first, and respectively second, optical coupler.
- the wavelength selection module comprises a wavelength selective switch exhibiting a shared port connected to the first, and respectively second, output section, a first selectable port connected to the second, and respectively first, input section, and a second selectable port connected to the output branch of the first, and respectively second, optical coupler.
- the input branch of the first, and respectively second, optical coupler is connected to the first, and respectively second, input section by a power splitter in order to sample said first, and respectively second, incoming traffic.
- the output branch of the first, and respectively second, optical coupler is connected to the first, and respectively second, output section by a power combiner.
- the input branch of the first, and respectively second, optical couple comprises an optical isolator.

the wavelengths allowed through by the first selectable port of the wavelength selective switch of the first insertion and extraction module are different from the wavelengths allowed through by the first selectable port of the wavelength selective switch of the second insertion and extraction module, and the wavelengths allowed through by the second selectable port of the wavelength selective switch of the first insertion and extraction module are different from the wavelengths allowed through by the second selectable port of the wavelength selective switch of the second insertion and extraction module One idea at the basis of the invention is constructing a transparent network element with the assistance of a limited number of WSSs. Another idea at the basis of the invention is to obtain such a network element which exhibits a high configuration flexibility, such as for handling situations such as high network congestion, a low number of available channels, a failure of transmitters or receivers, or severe restrictions on the signal powers transmitted or received.

BRIEF DESCRIPTION OF DRAWINGS

The invention will be better understood, and other purposes, details, characteristics, and advantages thereof will become more clearly apparent upon examining the following description of multiple particular embodiments of the invention, which are given only by way of illustrative and non-limiting examples, with reference to the attached drawings. In these drawings:

FIG. 1 is a functional schematic depiction of a first embodiment of the invention, FIG. 2 is a functional schematic depiction of a second embodiment of the invention.

DETAILED DESCRIPTION

As a reminder, a wavelength selective switch is a piece of equipment comprising a plurality of selectable ports and at least one shared port, which can fulfill a programmable multiplexing function or a programmable de-multiplexing function. Whenever it acts as a demultiplexer, the selectable ports serve as outputs and the shared port serves as a common input. The wavelength selective switch is capable of routing every optical signal received on its shared input, selectively as a function of the wavelength of that signal and a control signal, to one of its outputs. This equipment thereby performs a programmable demultiplexing function of optical signals with different optical wavelengths, which are aligned on a predetermined grid, thereby enabling each optical signal present at the common input to be directed to one of the output ports as a function of its wavelength and of a command. Each output port may therefore selectively receive a channel present at the shared input, multiple channels present at the shared input, or no channels. The function of deleting or blocking a channel may be built into a wavelength selective switch. If so, the channel is oriented towards a specific location of the wavelength selection switch, where it is absorbed. Some models of WSSs are also capable of simultaneously transmitting a single channel to multiple ports (multicast).

This same piece of equipment can also perform the reverse function, i.e. programmable multiplexing, by exchanging the roles of the outputs and input. If so, the selectable ports serve as inputs, and the shared port serves as a common output. The wavelength selective switch is capable of routing optical signals received at the inputs, selectively as a function of the wavelengths and the respective inputs and as a function of a command signal, to the shared output of that equipment. Naturally, the optical signals routed to the common output should have different wavelengths. In this situation, the equipment carries out a programmable multiplexing function for providing a channel selected from among the channels received at the inputs, or a multiplex of outputs made up of a set of signals selected from among the received signals, at its output. At each input port, one channel, multiple channels, or no channel may be sent. If a blocking function is implemented, a signal present at an input port may be blocked and absorbed.

FIG. 1 depicts a ROADM 10 having a broadcast-and-select general architecture and configured between a first neighboring node 100 and a second neighboring node 200. The ROADM 10 may exchange wavelength division multiplexed signals with the neighboring node 100 through an input optical fiber 1 and an output optical fiber 2 and with the neighboring node 200 through an input optical fiber 3 and an output optical fiber 4. The main functions of the ROADM 10 are extracting optical signals, in order to locally demodulate signals received from the other nodes at chosen wavelength channels, inserting optical signals, in order to transmit locally generated signals to other nodes at chosen wavelength channels, and transparently transmitting optical signals, in order to allow through traffic traveling between the nodes 100 and 200 at chosen wavelength channels. One advantage of the broadcast and select architecture is the ability to jointly carry out the extraction and transparent transmission of a given signal (drop and continue).

From input fiber 1, a 1×2 optical coupler 5 broadcasts all of the traffic coming in to a transit line 9 as well as to an input branch 7 of a 2×2 optical coupler. The transit line 9 is connected to an input port of a WSS 6 assembled as a programmable multiplexer, whose output is connected to the output fiber 4. Another input of the WSS 6 is connected to an output branch 10 of a 2×2 optical coupler 11 to insert traffic onto the output line 4.

The WSS 6 therefore makes it possible, owing to its internal configuration resulting from its programming, to selectively allow through to the output 4, both wavelength channels constituting traffic in transit from the input fiber 1, and wavelength channels constituting traffic to be inserted from the coupler 11, whose function will be explained further on. These wavelength channels must be distinct in order to avoid collisions.

From the input fiber 3, a 1×2 colorless optical coupler 12 broadcasts all of the incoming traffic both to a transit line 13 and to an input branch 14 of the optical coupler 11. The transit line 13 is connected to an input port of a WSS 15 assembled as a programmable multiplexer, whose output is connected to the output fiber 2. Another input of the WSS 15 is connected to an output branch 16 of the optical coupler 8 to insert traffic onto the output line 2.

The WSS 15 therefore makes it possible, owing to its internal configuration resulting from its programming, to selectively allow through to the output 2, both wavelength channels constituting traffic travelling from the input fiber 3, and wavelength channels constituting traffic to be inserted from the coupler 8. These wavelength channels must be distinct in order to avoid collisions.

The optical coupler 8, and respectively 11, operates bidirectionally and is connected by two bidirectional branches 21 and 22, and respectively 23 and 24, to two insertion and extraction modules 30 and 40. In the signal-extraction direction, the coupler 8 broadcasts the incoming traffic that it receives through the input branch 7 to the two branches 21 and 22. In the signal-insertion direction, the coupler 8 merges the signals to be inserted, which it receives through the two branches 21 and 22 to the output branch 16. In the signal-extraction direction, the coupler 11 broadcasts the incoming traffic that it receives through the input branch 14 to the two branches 23 and 24. In the signal-insertion direction, the coupler 11 merges the signals to be inserted, which it receives through the two branches 23 and 24 to the output branch 10.

The insertion and extraction module 30 comprises a WSS 31 used bidirectionally. The WSS 31 comprises two selectable ports, one connected to the branch 21 of the coupler 8 and the other to the branch 23 of the coupler 11. The shared port 32 of the WSS 31 is connected both to a set of optical receivers 35 for demodulating optical signals to be extracted and a set of optical transmitters 36 for generating optical signals to be inserted. To direct the optical signals down to the receivers 35, an optical circulator 38 and a distributing element 37 are provided. The distributing element 37 may be a fixed wavelength channel demultiplexer or a WSS or a colorless component like a power splitter. In this last situation, optical filters are provided in the receivers 35 to select the wavelengths to be demodulated, such as tunable filters. A signal-combining element 39 brings together the optical signals generated by the optical transmitters 36 and directs them to the circulator 38. The optical transmitters 36 are preferentially wavelength-tunable. If need be, the signal-combining element 39 may be a WSS or a colorless component. Other configurations are possible to connect the WSS 31 to the receivers 35 and transmitters 36, for example with the help of optical couplers and isolators.

The WSS 31 receives through the branch 21 all the traffic entering the fiber 1 and through the branch 23 all the traffic entering the fiber 3. The WSS 31 may therefore be configured to allow through to all the optical receivers 35 a first set of channels forming traffic to be extracted from the fiber 1 and a second set of channels forming traffic to be extracted from the fiber 3, provided that these two assemblies are strictly separate in terms of wavelengths.

To remedy this limitation, and therefore to also allow signals with the same wavelength to be extracted coming from the node 100 and from the node 200, the second insertion and extraction module 40 is designed and connected identically to the module 30. Thus, the two aforementioned signals may be received, one in the module 30 through the branch 21 of the coupler 8, and the other in the module 40 through the branch 24 of the coupler 11. To do so, the WSS 41 of the module 40 is configured differently from the WSS 31, so that the WSSs 31 and 41 always allow through sets of wavelengths which are mutually complementary, either to or from a given 2×2 coupler (8 or 11), and therefore to and from a given neighboring node (100 or 200).

Owing to the bidirectional use of the WSS 31, whenever the WSS is configured to allow through a wavelength channel from one of the couplers 8 and 11 to the receivers 35, it also allows this wavelength channel through in the uplink direction from the transmitters 36 to that same coupler, provided that such a channel is actually generated by these transmitters. The architecture of FIG. 1 is therefore particularly suited to an allocation of wavelengths in which the same channels are used in one direction to extract the traffic received from a neighboring node and in the other direction for inserting traffic to that same neighboring node. However, provided that there are enough channels available on fibers 1 and 2, this pairing-up of extracted and inserted channels is not essential, and may also be partial, or even absent.

In FIG. 1, isolators 51 and 52 are provided on the input branches of couplers 8 and 11 to keep the inserted traffic from being transmitted within the input fiber 1 or 3, which could degrade the received signals due to unwanted reflections. However, such isolators may be placed on other points of the ROADM. Additionally, some components of the WDM network may already comprise isolators, for example optical amplifiers not depicted here, which could make the isolators 51 and 52 depicted here superfluous.

In the architecture of FIG. 1, the signals inserted in the direction of an output fiber 2 or 4 are superimposed on the traffic travelling within the WSS 15 or 6. This WSS therefore makes it possible to individually adjust the attenuations of the inserted channels and travelling channels, without in any way affecting the power levels of the extracted channels. Unlike a completely bidirectional architecture, an attenuation adjustment may therefore be carried out the same for both the extracted traffic and the inserted traffic.

As has been mentioned, the configuration of the two modules 30 and 40 makes it possible to select with great flexibility the wavelengths that need to be inserted and/or extracted coming from or going to a given node. Compared to an architecture in which an insertion and extraction module is devoted solely to communications with a given neighboring node, the configuration of the couplers 8 and 11 enable effective sharing of all of the WDMON's signal insertion and extraction resources between the WDMON's two interfaces, to with the interface 60 with the neighboring node 100 and the interface 70 with the neighboring node 200. As a result, it is possible to process heavily dyssemtrical traffic, such as that which comprises a much greater number of wavelength channels to be inserted going towards and/or extracted coming from one of the neighboring nodes than when going towards and/or coming from the other node. Additionally, the sharing of the receivers and transmitters enables the ROADM 10 to retain all of its communication functionalities with the two neighboring nodes, even in the event of a failure of part of these receivers and transmitters.

The architecture of FIG. 1 is achievable with 1×2 WSSs, particularly because it uses only a single port for insertion within WSSs 6 and 15. However, WSSs exhibiting a greater number of ports may also be used, such as to enhance the functionalities of the ROADM.

With reference to FIG. 2, we will now describe a ROADM 110 having a general architecture of the preselect and combine type and configured between a first neighboring node 100 and a second neighboring node 200. Figures identical or analogous to those in FIG. 1 bear the same reference number, increased by 100. Unlike in FIG. 1, the input fiber 101 is connected to the shared port of a WSS 105 operating as a programmable demultiplexer for sending wavelength channels to be extracted to the branch 107 and the channels in transit to the transit line 109. The same channel therefore cannot both be extract and transit transparently, unless the WSS 105 is specially designed to fulfill this function. At the other end of the transit line 109, the channels to be inserted coming from the branch 110 are merged with the channels in transit by a colorless combiner 106. Attenuation adjustment of the inserted channels may be carried out within the WSSs 131 and 141. Independent attenuation adjustment for the extracted channels and those in transit may be carried out within the WSS 105. Similar considerations apply to traffic transmitted in the reverse direction. For the rest, this ROADM has similar functions to that of FIG. 1.

Other architectures may also be designed, such as by combining elements of FIGS. 1 and 2. Thus, in one embodiment, a WSS is provided at each end of the transit lines. In another embodiment, only colorless components like optical couplers are provided at both ends of the transit lines. In this latter situation, it may additionally be provided a wavelength blocker on each of the transit lines, to block channels that are not to transit to the neighboring node.

Although the invention has been described in connection with multiple specific embodiments, it is naturally not in any way limited to them, and comprises all technical equivalents of the means described, as well as their combinations, if said combinations fall within the scope of the invention.

The use of the verb "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple means or modules may be depicted by a single hardware element.

In the claims, any reference sign within parentheses should not be interpreted as limiting the claim.

The invention claimed is:

1. A network element (10, 110) for a wavelength division multiplexing optical network, said network element comprising:
    a first optical input section (1, 101) intended to be connected to a first neighboring network element to receive a first incoming traffic from the first neighboring network element;
    a first optical output section (2, 102) intended to be connected to said first neighboring network element to transmit a first outgoing traffic to the first neighboring network element;
    a second optical input section (3, 103) intended to be connected to a second neighboring network element (200) to receive a second incoming traffic from the second neighboring network element;
    a second optical output section (4, 104) intended to be connected to said second neighboring network element to transmit a second outgoing traffic to the second neighboring network element;
    first and second insertion and extraction modules (30, 40; 130, 140), each of said insertion and extraction modules comprising:
        a wavelength selective switch (31, 41; 131, 141) comprising a shared port and a plurality of selectable ports, said switch being configured to selectively allow through a first subset of wavelengths of the optical network between said shared port and a first of said selectable ports, said switch being configured to selectively allow through a second subset of wavelengths of the optical network between said shared port and a second of said selectable ports;
        a plurality of optical receivers (35) connected to the shared port for receiving through the first selectable port, optical signals whose wavelengths belong to the first subset, and through the second selectable port, optical signals whose wavelengths belong to the second subset; and
        a plurality of optical transmitters (36) connected to the shared port for sending through the first selectable port, optical signals whose wavelengths belong to the first subset, and through the second selectable port, optical signals whose wavelengths belong to the second subset;
    said network element further comprising:
    a first optical coupler (8, 108) comprising two bidirectional branches (21, 22; 121, 122) respectively connected to the first selectable port of the first and second insertion and extraction modules, an input branch (7, 107) connected to the first input section (1, 101) to allow optical signals to be extracted through to said two bidirectional branches, and an output branch (16, 116) connected to the first output section (2, 102) to allow optical signals to be inserted through to said two bidirectional branches; and
    a second optical coupler (11, 111) comprising two bidirectional branches (23, 24; 123, 124) respectively connected to the first selectable port of the first and second insertion and extraction modules, an input branch (14, 114) connected to the second input section (3, 103) to allow optical signals to be extracted through to said two bidirectional branches, and an output branch (10, 11) connected to the second output section (4, 104) to allow optical signals to be inserted to pass through to said two bidirectional branches.

2. A network element according to claim 1, characterized by the fact that it comprises a first unidirectional optical transit section (9, 109) to allow a first transit traffic to pass between the first input section and the second output section, and a second unidirectional optical transit section (13, 113) for allowing a second transit traffic to pass between the second input section and the first output section.

3. A network element according to claim 2, characterized by the fact that each of the first and second transit sections comprises a wavelength selection module (6, 15; 105, 112) to select the first, and respectively second, transit traffic by filtering the wavelengths of the first, and respectively second, incoming traffic.

4. A network element according to claim 3, characterized by the fact that said wavelength selection module comprises a wavelength blocker.

5. A network element according to claim 3, characterized by the fact that said wavelength selection module comprises a wavelength selection switch (105, 112) exhibiting a shared port connected to the first, and respectively second, input section, a first selectable port connected to the second, and respectively first, output section, and a second selectable port connected to the input branch of the first, and respectively second, optical coupler.

6. A network element according to claim 3, characterized by the fact that said wavelength selection module comprises a wavelength selection switch (15, 6) exhibiting a shared port connected to the first, and respectively second, output section, a first selectable port connected to the second, and respectively first, input section, and a second selectable port connected to the output branch of the first, and respectively second, optical coupler.

7. A network element according to claim 1, characterized by the fact that said input branch of the first, and respectively second, optical coupler is connected to the first, and respectively second, input section by a power divider (5, 12) to sample said first, and respectively second, incoming traffic.

8. A network element according to one of the claim 1, characterized by the fact that said output branch of the first, and respectively second, optical coupler is connected to the first, and respectively second, output section by a power combiner (115, 106).

9. A network element according to one of the claim 1, characterized by the fact that said input branch of the first, and respectively second, optical coupler comprises an optical isolator (51, 52).

10. A network element according to one of the claim 1, characterized by the fact that the wavelengths that the first selectable port of the wavelength selective switch (31, 131) of the first insertion and extraction module are different from the wavelengths allowed through by the first selectable port of the wavelength selective switch (41, 141) of the second insertion and extraction module, and the wavelengths allowed through by the second selectable port of the wavelength selective switch of the first insertion and extraction module are different from the wavelengths allowed through by the second selectable port of the wavelength selective switch of the second insertion and extraction module.

\* \* \* \* \*